Figure 1:
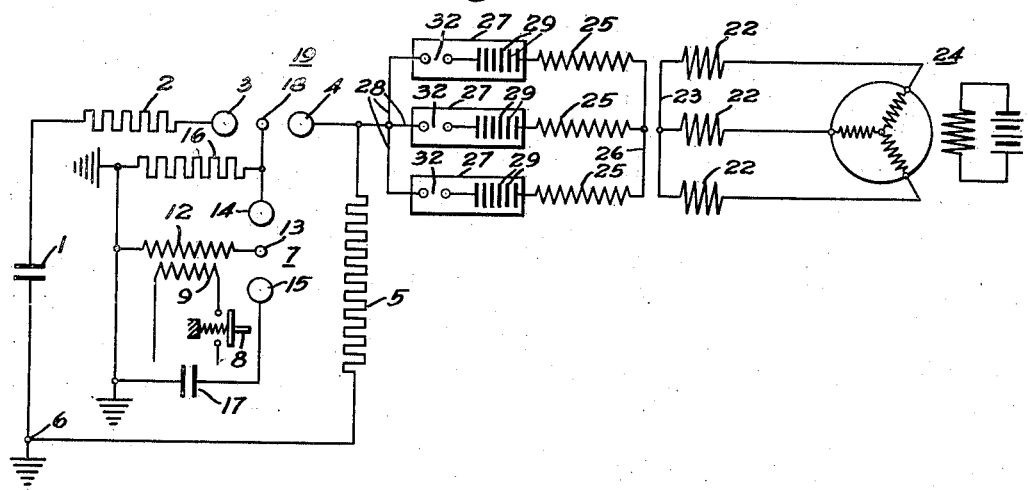

Patented June 13, 1939

2,162,539

UNITED STATES PATENT OFFICE 2,162,539

METHOD AND MEANS FOR TESTING ELECTRIC MACHINES

Joseph Rebhan and Richard Elsner, Nuremberg, Germany, assignors to Westinghouse Electric & Manufacturing Company, East Pittsburgh, Pa., a corporation of Pennsylvania Application June 9, 1937, Serial No. 147,281
In Germany July 1, 1936

6 Claims. (Cl. 175—183)

Our invention relates to a method of and means for testing electrical apparatus, and particularly for testing the impulse voltage strength of the insulation employed in such apparatus.

The insulation of electrical apparatus, such as generators and transformers, is continually subjected to a normal operating voltage at a frequency corresponding to the established frequency of the power system to which it is connected, usually 60 cycles or 25 cycles per second. While operating under such normal voltages and frequency, surges may be caused on the power system by switching operations on the system or by lightning disturbances. The impulse voltage strength of the insulation is its ability to withstand these surges.

If lightning surges strike and damage a transformer or other electrical apparatus in actual service, the fact is known only from the obvious effects of the flow of dynamic current from the power line into the fault produced by the lightning surge. In order that a transformer may withstand such conditions in actual service, it is necessary that the transformer insulation be sufficient to withstand the effect of the voltage impulse when it is operating at normal voltage and frequency.

Our invention contemplates the use of a circuit arrangement for the impulse testing of electrical apparatus such as polyphase transformers and generators, and particularly polyphase apparatus having an insulated or ungrounded neutral. In order to prevent power arcs from following a discharge of the surge generator that might damage the generator, the surge generator is connected to the energized windings under test through protective devices, such as cathode drop devices.

It is, therefore, an object of our invention to provide a method of and means for testing the impulse strength of insulation applied to electrical apparatus.

Another object of our invention is the provision of means for applying impulse voltage tests to electrical apparatus under conditions similar to those existing when the apparatus is in service, and for determining the failure of the electrical apparatus when so tested.

A further object of our invention is the provision of means for protecting the surge generator from the normal frequency dynamic power impressed on the transformer during impulse testing.

Figure 2:
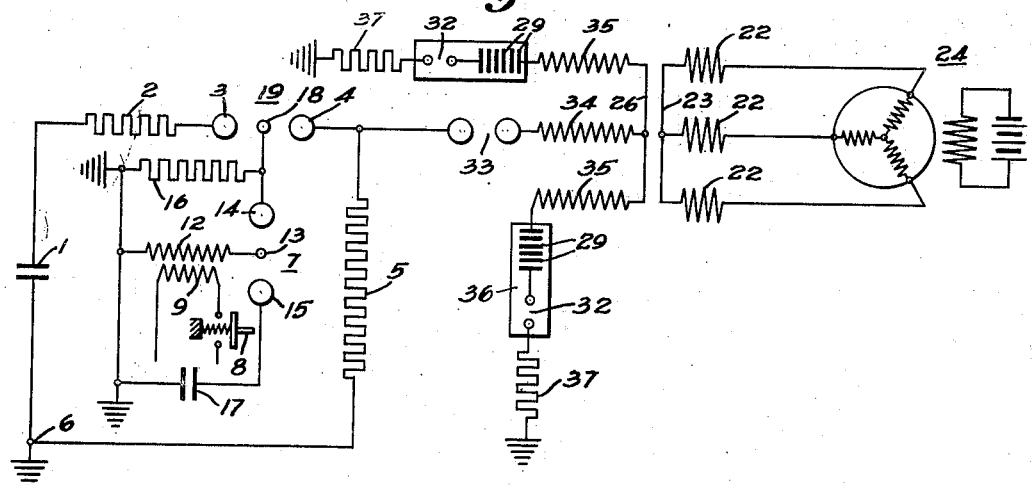

In the drawing:

Figure 1 is a diagrammatic illustration of a preferred arrangement of circuits and apparatus employed for three-phase testing of an energized three-phase transformer winding having an ungrounded neutral, and Fig. 2 is a diagrammatic illustration of a connection for testing a three-phase electrical machine in which one phase winding only is directly connected to the impulse generator.

In Figure 1, a surge generator or impulse generator consisting of a bank of condensers is diagrammatically represented by the condenser 1, the resistor 2 and the spark gap represented by the spheres 3 and 4, and the resistor 5. The resistor 2 constitutes a damping resistance provided for obtaining a smooth wave front, and the resistor 5 that is connected between the sphere 4 and the grounded side 6 of the condenser bank 1 is a discharge resistance that determines the tail length of the impulse wave.

A simplified tripping mechanism 7 is illustrated for the surge generator, and comprises a push button 8 that is employed to close a circuit for energizing the low voltage winding 9 of a step-up transformer having a high-voltage winding 12 which is connected to the middle electrode 13 of a triple gap device comprising the electrodes 13, 14 and 15, the two electrodes 14 and 15 of which are connected to the other terminal of the high-voltage winding 12 through a resistor 16 and a capacitor 17, respectively, so that the triple gap device breaks at or near the crest of the power frequency voltage. The electrode 14 of the gap device is connected to the intermediate gap electrode 18 of a main triple gap device 19, the connections being such that the intermediate gap electrode 18 is given a potential which is opposite to the potential of the ungrounded electrode 3 of the main gap device 19, so that the gap between the electrodes 3 and 18 first breaks down, after which the full voltage of the surge generator is applied to the lower gap between terminals 18 and 4, breaking down the latter and causing the surge generator to discharge through the apparatus under test.

The apparatus under test is illustrated as a three-phase transformer, the low voltage windings 22 of which are connected to a common neutral 23 and supplied with energy at normal voltage and frequency from an alternating current generator 24. The high-voltage windings 25 of the transformer are likewise connected to a common ungrounded neutral 26 and the outer ends of the star connected windings 25 are each connected through a cathode drop discharge device 27 and one of the branch conductors 28 to the terminal 4 of the main triple gap device 19 through which the impulse generator discharges.

The cathode drop discharge devices 27 may be of a well known construction consisting of a stack of high resistance bodies 29 in series and an extinguishing spark gap 32. The bodies 29 may be discs that are insulated from one another by air or by mica in such a way as to permit glow discharges therebetween but prevent low resistance arcs. One such discharge device is disclosed in U. S. Patent 1,509,493 to Joseph Slepian, dated September 23, 1934, and assigned to the same assignee as this application.

The gaps 32 are provided to insure that after the impulse wave from the surge generator has been applied to the apparatus under test, the arcs, which the normal operating voltage attempts to maintain between the individual phase windings of the apparatus or between these phase windings and ground, are extinguished by the spark gaps of the cathode drop discharge devices within one half-cycle. It is, therefore, possible by employing the arrangement of apparatus and circuits disclosed to approximate, quite accurately the effects of lightning surges on electrical apparatus under operating conditions found in practice while energized from a power supply system.

If it is desired to test a three-phase electrical machine, such as a transformer, by applying a single-phase impulse to it, the arrangement of apparatus may correspond to that shown in Fig. 2, in which the surge generator and the means for tripping it are the same as that shown in Fig. 1.

In this case, however, the surge generator comprising the capacitor battery 1, the main discharge spark gap 19 and the associated resistors is discharged through an auxiliary spark gap 33 into one of the phase windings 34 of the apparatus under test, the remaining phase windings 35 being connected to ground through cathode drop discharge devices 36 and resistors 37, the devices 36 corresponding to the cathode discharge devices 27 of Fig. 1. In order to reproduce as accurately as possible the conditions actually prevailing in practice, the resistors 37 provided in the ground connections of the phase windings 35 are chosen with a resistance corresponding to the wave impedance, say 500 ohms, of the power supply circuit to which the apparatus under test is intended to be connected in practice.

In order to insure the interruption of a short circuit current to ground which might flow from the apparatus under test through the surge generator after the surge generator has been discharged, the auxiliary spark gap 33 may be replaced by a cathode drop discharge device 36 consisting of the stack of high resistance bodies 29 in series with the spark gap 32, as previously described.

The impulse or surge generator is of a well known construction and consists of a number of capacitors that are charged in parallel and discharged in series through the apparatus under test. The series discharge connection may be established either by spark gaps, as illustrated, or by well known switching mechanisms.

Modifications of the circuits and apparatus illustrated and described will occur to those skilled in the art within the spirit of our invention, and we do not wish to be limited otherwise than by the scope of the appended claims.

We claim as our invention:

1. The method of testing the impulse-voltage strength of a multiphase electrical winding which consists in applying thereto an alternating dynamic voltage of normal value and frequency, and in applying a voltage surge to one phase of the winding while the remaining phases are connected to ground through cathode drop discharge devices and resistors chosen to provide resistances substantially equal to the wave impedance of the power circuit to which the windings are designated to be connected.

2. The method of testing the impulse-voltage strength of interconnected multiphase electrical windings which consists in applying thereto an alternating dynamic voltage of normal value and frequency, and in simultaneously applying a voltage surge to the several phase windings through discharge means adapted to interrupt the flow of power circuit current between the several phase windings and from the windings to the impulse-voltage source following the application of the voltage surge.

3. Apparatus for simultaneously testing the impulse strength of the several phase windings of a multiphase electrical machine comprising a dynamic alternating voltage power source connected to energize said windings, a surge generator for applying a surge voltage to said windings, a multiple branch circuit for connecting said surge generator to each of said several windings and each including a cathode-drop discharge device having a gap in series with a plurality of high resistance bodies, the length of the gap between them being sufficiently small to cause a discharge to be distributed over the surface of the bodies.

4. Apparatus for testing the impulse strength of electrical insulating material applied to an underground multiphase electrical machine comprising a dynamic alternating voltage power source connected to the machine insulated by said material, a surge generator, and means for applying a surge voltage from said generator to said insulated means while the multiphase power source voltage is applied including in a circuit a cathode drop discharge device in each phase circuit having a gap in series with a plurality of high resistance bodies, the length of the gap between them being sufficiently small to cause a discharge to be distributed over the surface of the bodies.

5. Apparatus for testing the impulse strength of a multiphase electrical winding while energized at its normal operating power supply circuit voltage and frequency comprising a surge generator for applying a surge voltage to said windings characterized in that the surge generator is connected to one of the phase windings through a spark gap, and the other phase windings are each connected to ground through cathode drop discharge devices and resistors, the resistances of the resistors being chosen to be substantially equal to the wave impedance of the power-supply circuit to which the windings are designed to be connected.

6. Apparatus for simultaneously testing the impulse strength of the several phase windings of an ungrounded multiphase electrical machine comprising a dynamic alternating voltage power source connected to energize said windings, a surge generator for applying a surge voltage to the said windings while energized from the power source, and a circuit for connecting said surge generator to each of said several windings including means for interrupting the flow of power current from said machine to said generator after discharge of said generator.

JOSEPH REBHAN.
RICHARD ELSNER.